US006716480B2

(12) United States Patent
Yukinobu et al.

(10) Patent No.: US 6,716,480 B2
(45) Date of Patent: Apr. 6, 2004

(54) TRANSPARENT CONDUCTIVE LAYERED STRUCTURE AND METHOD OF PRODUCING THE SAME, COATING LIQUID FOR FORMING TRANSPARENT COATING LAYER AND COATING LIQUID FOR FORMING TRANSPARENT CONDUCTIVE LAYER

(75) Inventors: Masaya Yukinobu, Chiba (JP); Atsushi Tofuku, Chiba (JP); Kenji Kato, Chiba (JP); Midori Fujisaki, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 0 days.

(21) Appl. No.: 10/329,573

(22) Filed: Dec. 27, 2002

(65) Prior Publication Data

US 2003/0165616 A1 Sep. 4, 2003

Related U.S. Application Data

(62) Division of application No. 09/645,471, filed on Aug. 24, 2000.

(30) Foreign Application Priority Data

Aug. 26, 1999 (JP) .............................. 11-239771
Feb. 18, 2000 (JP) ........................ 2000-041887
Jun. 22, 2000 (JP) ........................ 2000-187580

(51) Int. Cl.$^7$ .............................. B05D 5/06; B05D 5/12; B05D 1/36; B05D 3/02

(52) U.S. Cl. ..................... 427/108; 427/164; 427/376.1; 427/376.6; 427/419.1; 427/402

(58) Field of Search .............................. 427/108, 164, 427/376.1, 376.6, 419.1, 402

(56) References Cited

U.S. PATENT DOCUMENTS

| 4,611,892 A | * | 9/1986 | Kawashima et al. | ........ 351/159 |
| 5,492,958 A | | 2/1996 | Haluska et al. | ............. 524/339 |
| 5,681,890 A | | 10/1997 | Tanaka et al. | ............. 524/339 |
| 5,785,897 A | | 7/1998 | Toufuku et al. | ............ 252/514 |
| 5,814,703 A | | 9/1998 | Yamaya et al. | ............ 525/103 |
| 6,086,790 A | * | 7/2000 | Hayashi et al. | ............ 252/500 |

FOREIGN PATENT DOCUMENTS

EP          0803551          3/1998

(List continued on next page.)

OTHER PUBLICATIONS

Abstract—JP Publication 09–115438 dated May 2, 1997.
Abstract—JP Publication 07–282745 dated Oct. 27, 1997.

*Primary Examiner*—Michael Barr
(74) *Attorney, Agent, or Firm*—Armstrong, Kratz, Quintos, Hanson & Brooks, LLP (57) ABSTRACT

The present invention relates to a transparent conductive layered structure which comprises a transparent substrate, a transparent conductive layer and a transparent coating layer formed successively in this order on the substrate, and is used in, for instance, the front panel of displays such as CRT, etc. The transparent conductive layered structure according to the invention is characterized in that the main components of the above-mentioned transparent conductive layer are gold microparticles or gold-containing noble metal microparticles containing 5 wt % or more of gold with a mean particle diameter of 1 to 100 nm, and a binder matrix comprising at least one functional group selected from mercapto groups (—SH), sulfide groups (—S), and polysulfide groups (—$S_x$, X≧2). Film strength and weather resistance of the transparent conductive layer are improved because the noble metal microparticles and a binder matrix are firmly bonded via the above-mentioned functional groups.

8 Claims, 2 Drawing Sheets

FOREIGN PATENT DOCUMENTS

| | | |
|---|---|---|
| EP | 0911859 | 4/1999 |
| JP | 08-77832 | 3/1996 |
| JP | 09-55175 | 2/1997 |
| JP | 09-286936 | 11/1997 |
| JP | 10-188681 | 7/1998 |
| JP | 10-204336 | 8/1998 |
| JP | 11-203943 | 7/1999 |
| JP | 11-203943 A * 7/1999 | ............ H01B/5/14 |

* cited by examiner

TRANSPARENT CONDUCTIVE LAYERED STRUCTURE AND METHOD OF PRODUCING THE SAME, COATING LIQUID FOR FORMING TRANSPARENT COATING LAYER AND COATING LIQUID FOR FORMING TRANSPARENT CONDUCTIVE LAYER

This application is a division of prior application Ser. No. 09/645,471 filed Aug. 24, 2000.

FIELD OF THE INVENTION

The present invention relates to a transparent conductive layered structure having a transparent substrate and a transparent conductive layer and transparent coating layer formed in succession on this substrate that is used in the front panel, etc., of CRT, etc., displays. In particular, it relates to a transparent conductive layered structure with excellent film strength, weather resistance, conductivity, etc., of the transparent conductive layers and with which a reduction in production cost is expected, and method of producing the same, a coating liquid for forming a transparent coating layer and a coating liquid for forming a transparent conductive layer used in this production method, and a display that uses the transparent conductive layered structure.

DESCRIPTION OF THE PRIOR ART

In addition to being able to easily see the display screen and thereby preventing visual fatigue, today there is a demand for cathode ray tubes (CRTs), which are used as computer displays, etc., with which there is no adhesion of dust or electrical shock due to electrostatic charge of the CRT screen.

Furthermore, in recent years there has been concern over the detrimental effects of low-frequency electromagnetic waves generated from CRTs on the human body and it is preferred that these types of electromagnetic waves not be leaked to the outside.

Moreover, problems with the same electrostatic charge and leakage of electromagnetic waves as with CRTs have recently been pointed out with plasma display panels (PDPs) used in wall-mounted televisions.

It is possible to prevent this leakage of electromagnetic waves by, for instance, forming a transparent conductive layer on the front panel of the display.

The above-mentioned method of preventing the above-mentioned leakage of electromagnetic waves is theoretically the same as countermeasures that have recently been taken to prevent electrostatic charge. However, the above-mentioned transparent conductive layer must have a much higher conductivity than conductive layers that are formed for prevention of electrostatic charge (as high as $10^8$ to $10^{10}$ $\Omega/\square$ in terms of surface resistance).

That is, it is necessary to form a transparent conductive layer with at least as low a resistance as $10^6$ $\Omega/\square$ (ohm per square) or less, preferably $5 \times 10^3$ $\Omega/\square$ or less, particularly $10^3$ $\Omega/\square$ or less, in order to prevent leakage of electromagnetic waves (electric shielding) of CRTs, and a resistance of, for instance, 10 $\Omega/\square$ or less is needed in PDPs.

Moreover, thus far there have been several suggestions for dealing with the above-mentioned electric shielding. For instance, (1) the method of applying and drying a coating liquid for forming a transparent conductive layer of conductive oxide microparticles, such as indium tin oxide (ITO), etc., or metal microparticles dispersed in a solvent on the front panel of a CRT and then baking this at a temperature of about 200° C. to form the above-mentioned transparent conductive layer, (2) the method of forming a transparent conductive tin oxide film (NESA film) on the above-mentioned panel surface by high-temperature chemical vapor deposition (CVD) of tin chloride, (3) the method of forming a transparent conductive film of indium tin oxide and titanium oxynitride on a front panel by sputtering, and the like have been presented for CRTs.

Moreover, (4) the method of forming a conductive film by placing a conductive mesh made of metal or metal-coated fibers on the device body side of a front panel of a PDP, (5) the method whereby a transparent conductive film made by sputtering of a metal such as silver, etc., is formed on the above-mentioned panel and the like have been presented for PDPs.

However, there is a problem with method (4) for PDPs in that since a conductive mesh is used, surface resistance is low and transmittance is also low. There is also a problem in that a moiré pattern is produced and a problem in that the process for forming a conductive film is complex and cost is high.

In contrast to this, method (1) for CRTs is much simpler and production cost is lower than methods (2), (3) and (5) whereby a transparent conductive film is formed by CVD or sputtering and therefore, the method under (1) that uses a coating liquid for forming a transparent conductive layer is very advantageous for the above-mentioned CRTs as well as for PDPs.

However, the surface resistance of the film that is obtained is high at $10^4$ to $10^6$ $\Omega/\square$ and is not sufficient for blocking leakage of an electric field with a coating liquid for forming a transparent conductive layer that uses conductive oxide microparticles, such as indium tin oxide (ITO), etc., by method (1).

On the other hand, transmittance of the film obtained using a coating liquid for forming a transparent conductive layer using metal microparticles is low in comparison to coating liquid that uses ITO because the metal microparticles are not light transmitting. However, since the metal microparticle layer takes on a network structure during film formation after application, the reduction in the above-mentioned transmittance is small and a low resistance film of $10^2$ to $10^3$ $\Omega/\square$ is obtained. Therefore, it is considered to be a method with good prospects for the future.

Moreover, the metal microparticles that are used for the above-mentioned coating liquid for forming a transparent conductive layer are limited to noble metals, such as silver, gold, platinum, rhodium, palladium, etc., which rarely oxidize in air, as shown in Japanese Laid-Open Patent No. Hei 8-77832 and Japanese Laid-Open Patent No. Hei 9-55175. This is because when metal microparticles other than a noble metal, such as iron, nickel, cobalt, etc., are used, an oxide film always forms on the surface of these metal microparticles in an air ambient atmosphere and good conductivity as a transparent conductive layer is not obtained.

Furthermore, when specific resistance of the above-mentioned silver, gold, platinum, rhodium, palladium, etc., is compared, the specific resistance of platinum, rhodium and palladium is high at 10.6, 5.1, and 10.8 $\mu\Omega\cdot$cm, respectively, when compared to the 1.62 and 2.2 $\mu\Omega\cdot$cm of silver and gold. Therefore, the use of gold particles and silver particles is preferable for forming a transparent conductive layer with low surface resistance. Consequently, silver microparticles and gold microparticles, etc., are mainly used as the above-mentioned metal microparticles.

However, when silver microparticles are used, there is a problem with weather resistance in that there is marked sulfurization, oxidation and degradation by brine, ultraviolet rays, etc., and therefore, gold-containing noble metal microparticles, such as gold-coated silver microparticles where the surface of silver microparticles is coated with gold, etc., and alloy microparticles, etc., made from gold and a noble metal other than gold (such as silver, etc.), have also been presented.

On the other hand, anti-glare treatment is performed for instance, on the front panel surface of CRTs in order to prevent reflection on the screen in order to make the display screen easy to see. This anti-glare treatment is done by the method whereby diffused reflection at the surface is increased by making fine irregularities in the surface. However, it cannot be said that this method is very desirable because image quality drops due to a reduction in resolution when it is used. Consequently, it is preferred that, instead, anti-glare treatment by the interference method be performed whereby the index of refraction of the transparent film and film thickness are controlled so that there is destructive interference of reflected light on incident light. In order to obtain low-reflection results by this type of interference method, a 2-layered film is generally used wherein optical film thickness of a film with a high index of refraction and a film with a low index of refraction is set at $\frac{1}{4}\lambda$ and $\frac{1}{4}\lambda$, respectively, or $\frac{1}{2}\lambda$ and $\frac{1}{4}\lambda$, respectively. Film consisting of the above-mentioned indium tin oxide (ITO) microparticles is also used as this type of film with a high index of refraction.

Furthermore, of the optical constants of metals (n−ik, n: index of refraction, $i^2=-1$, k: extinction coefficient), the value of n is small, but the value of k is very high when compared to ITO, etc., and therefore, even if a transparent conductive layer consisting of metal microparticles is used, the same anti-reflection results as with ITO are obtained by interference with light by the 2-layered film.

However, since gold is chemically inert, there is a problem with transparent conductive layers formed by a coating liquid for forming a transparent conductive layer that uses the above-mentioned gold microparticles or gold-containing noble metal microparticles as the metal microparticles in that it is difficult to strengthen the bond between these gold microparticles or gold-containing noble metal microparticles and a binder matrix of silicon oxide, etc., and therefore, film strength and weather resistance of the transparent conductive layers that are formed are insufficient.

SUMMARY OF THE INVENTION

The present invention focuses on these problems, its object being to present a transparent conductive layered structure with excellent film strength, weather resistance, conductivity, etc., of the transparent conductive layers.

Another object of the present invention is to present a method of producing a transparent conductive layered structure with excellent film strength, weather resistance, conductivity, etc., of the transparent conductive layers.

Yet another object of the present invention is to present a coating liquid for forming a transparent coating layer that can be used in the above-mentioned method of producing a transparent conductive layered structure.

Moreover, another object of the present invention is to present a coating liquid for forming a transparent conductive layer that can be used in the above-mentioned method of producing a transparent conductive layered structure.

Furthermore, another object of the present invention is to present a display with which surface reflection of the display screen is controlled and there is a long-term high electric shielding effect.

That is, the present invention is a transparent conductive layered structure, comprising a transparent substrate, a transparent conductive layer, and a transparent coating layer, wherein the transparent conductive layer and transparent coating layer are formed in succession on this transparent substrate, and the main components of the above-mentioned transparent conductive layer are gold microparticles or gold-containing noble metal microparticles containing 5 wt % or more of gold with a mean particle diameter of 1 to 100 nm and a binder matrix comprising at least one functional group selected from mercapto groups (—SH), sulfide groups (—S—), and polysulfide groups (—$S_x$—, $X \geq 2$).

In addition, the first method of producing this transparent conductive layered structure comprises the steps of applying a coating liquid for,forming a transparent conductive layer, whose main components are a solvent and gold microparticles or gold-containing noble metal microparticles containing 5 wt % or more of gold with a mean particle diameter of 1 to 100 nm dispersed in this solvent, to a transparent substrate, then applying a coating liquid for forming a transparent coating layer, whose main components are a functional group-containing compound having at least one functional group selected from mercapto groups (—SH), sulfide groups (—S—), and polysulfide groups (—$S_x$—, $X \geq 2$), a binder and a solvent, and performing heat treatment.

Moreover, the second production method comprises the steps of applying a coating liquid for forming a transparent conductive layer, whose main components are a solvent and gold microparticles or gold-containing noble metal microparticles containing 5 wt % or more of gold with a mean particle diameter of 1 to 100 nm and a functional group-containing compound having at least one functional group selected from mercapto groups (—SH), sulfide groups (—S—), and polysulfide groups (—$S_x$—, $X \geq 2$) dispersed in this solvent, to a transparent substrate, then applying a coating liquid for forming a transparent coating layer whose main components are a binder and a solvent, and performing heat treatment.

Next, the coating liquid for forming the transparent coating layer used in the above-mentioned first production method comprises as its main components a solvent, a binder, and a functional group-containing compound having at least one functional group selected from mercapto groups (—SH), sulfide groups (—S—), and polysulfide groups (—$S_x$—, $X \geq 2$), wherein the mixture ratio of the binder and the functional group-containing compound is 0.1 to 50 parts by weight functional group-containing compound per 100 parts by weight binder.

Moreover, the coating liquid for forming the transparent conductive layer used in the second production method comprises as its main components a solvent and gold microparticles or gold-containing noble metal microparticles containing 5 wt % or more of gold with a mean particle diameter of 1 to 100 nm and a functional group-containing compound having at least one functional group selected from mercapto groups (—SH), sulfide groups (—S—), and polysulfide groups (—$S_x$—, $X \geq 2$) dispersed in this solvent.

Furthermore, the above-mentioned display device comprises a display body and a front panel that has been placed on the front of the same body, wherein the above-mentioned transparent conductive layered structure is used as the above-mentioned front panel with the transparent 2-layered film side of the same on the outside.

DESCRIPTION OF THE PREFERRED EMBODIMENTS

The present invention will now be described in detail.

The present invention is based on the following concepts:

First, gold is chemically stable and has excellent weather resistance, chemical resistance, oxidation resistance, etc. Moreover, its specific resistance is low next to silver and copper. Therefore, there is both good conductivity and high chemical stability of the transparent conductive layer when gold microparticles or gold-containing noble metal microparticles are used as the metal microparticles of the above-mentioned transparent conductive layer.

However, since gold is chemically inert, there is a problem in that the bond between the binder matrix, such as silica, etc., and gold microparticles or gold-containing noble metal microparticles is weak and as a result, there is a reduction in film strength and weather resistance of the transparent conductive layer that uses gold microparticles or gold-containing noble metal microparticles as the above-mentioned metal microparticles.

Thereupon, the present invention focuses on the formation of a relatively strong bond between gold and functional groups, such as mercapto groups (—SH), sulfide groups (—S—), polysulfide groups (—$S_x$—, X≧2), etc.

That is, by using a binder matrix comprising at least one functional group selected from mercapto groups (—SH), sulfide groups (—S—), and polysulfide groups (—$S_x$—, X≧2) in the transparent conductive layer, it is possible to markedly improve film strength, weather resistance, etc., of the transparent conductive layer because the gold microparticles or gold-containing noble metal microparticles bond with these functional groups so that the bond at the interface in the binder matrix with the gold microparticles or gold-containing noble metal microparticles is strengthened.

The binder matrix comprising the above-mentioned functional groups here uses a functional group-containing compound having at least one functional group selected from mercapto groups (—SH), sulfide groups (—S—), and polysulfide groups (—$S_x$—, X≧2) [for instance, γ-mercaptopropyltrimethoxysilane, γ-mercaptopropylmethyldimethoxysilane, 3-(2-acetoxyethylthiopropyl)dimethoxymethylsilane, bis(triethoxysilylpropyl)tetrasulfane, thiomalic acid, thiosalicylic acid, thiodiglycolic acid, etc.] and resin binder or inorganic binder, and it is obtained by solidification of these binders. Moreover, the binder matrix comprising the above-mentioned functional groups comprises the above-mentioned functional groups as a structural component of the binder matrix, with the functional group-containing compound and resin binder or inorganic binder bonded together, or the binder matrix comprises the above-mentioned functional groups, with the above-mentioned functional group-containing compound mixed in the above-mentioned binder matrix without being bonded with resin binder or inorganic binder being bonded together.

The former state is preferred in terms of strength. That is, it is preferable in terms of strength because if in addition to the above-mentioned functional groups, such as mercapto groups (—SH), sulfide groups (—S—), polysulfide groups (—$S_x$—, X≧2), etc., hydrolyzable alkoxysilyl groups or functional groups produced by hydrolysis of alkoxysilyl groups [—$SiR^1_x(OR^2)_y$, $R^1$ and $R^2$ are $C_nH_{2n+1}$, n=0 to 4, x=0 to 2, Y=3−X] are contained in the molecules of the functional-group containing compound, these functional groups will firmly bond with the silica when silica sol is used as the binder (that is, the above-mentioned functional group-containing compound and binder will bond) and the bond at the interface in the silica matrix binder with the gold microparticles or gold-containing noble metal microparticles will be strengthened.

For instance, when a transparent conductive layer (hereafter referred to as Comparative Example 1) consisting of gold-and-silver 2-component-type microparticles (that is, gold-containing noble metal microparticles) and silicon oxide is set outdoors, degradation occurs in 1 to 2 months and there will be a marked rise in surface resistance of the transparent conductive film as a result of exposure to rain and the ultraviolet rays in sunlight. In contrast to this, there are no changes whatsoever in the transparent conductive layer when set aside for 3 months or longer, indicating that weather resistance is excellent, in the case of a transparent conductive layer (hereafter referred to as Example 1) that uses a binder matrix of silicon oxide comprising mercapto groups (SH groups) and trimethoxysilyl groups [—Si(OCH$_3$)$_3$] (Actually, the functional group [—Si(OH)$_3$] is produced as a result of hydrolysis in the coating liquid for forming a transparent coating layer.). Moreover, as shown in Table 4, the transparent conductive layer that used the binder matrix of silicon oxide comprising mercapto groups (SH groups) and trimethoxysilyl groups [—Si(OCH$_3$)$_3$] had better film strength than the transparent conductive layer that used a binder matrix of silicon oxide not comprising the above-mentioned functional groups.

The gold microparticles or gold-containing noble metal microparticles must have an mean particle diameter of 1 to 100 nm in the present invention. If they are smaller than 1 nm, it will be difficult to produce these microparticles, and they will not be suitable for practical use because they will readily aggregate in the coating liquid. Moreover, if they are larger than 100 nm, visible light transmittance of the transparent conductive layer that is formed will be too low, and even if film thickness is reduced to increase visible light transmittance, surface resistance will be too high and it will not be suitable for practical purposes.

Incidentally, the term mean particle diameter used here is the mean particle diameter of microparticles observed with a transmission electron microscope (TEM).

Moreover, the gold content in the above-mentioned gold-containing noble metal microparticles should be set within a range of 5 wt % or more, preferably 5 to 95 wt %, and should most preferably be set within a range of 50 to 95 wt %. This is because if the gold content is less than 5 wt %, there will be times when the effect of the gold is weak and weather resistance will deteriorate, while if the content exceeds 95 wt %, there will be few economic merits to using gold-containing noble metal microparticles in place of gold microparticles.

Next, the coating solution comprising gold-containing noble metal microparticles (gold-coated silver microparticles) of the present invention, which uses gold-containing noble metal microparticles as the metal microparticles, can be produced by, for instance, the following method:

That is, after preparing a colloidal dispersion of silver microparticles by conventional methods [for instance, the Carey-Lea method, Am. J. Sci., 37, 47 (1889), Am. J. Sci., 38 (1889)], a reducing agent such as hydrazine, etc., and an aurate are added to this dispersion to coat the silver microparticles with gold and obtain a gold-containing noble metal microparticle (gold-coated silver microparticle) dispersion. Incidentally, when necessary, a trace of dispersant can be added to one or both of the colloidal dispersion of silver microparticles and the aurate solution.

It is preferred that the electrolyte concentration of the dispersion then be reduced by a method such as dialysis, electrodialysis, ion exchange, ultrafiltration, etc. This is because the colloid generally aggregates with the electrolyte if the electrolyte concentration is not reduced. This phenomenon is also known as the Schulze-Hardy rule.

Finally, component adjustment (microparticle concentration, water content concentration, etc.), etc., of the gold-containing noble metal microparticle dispersion is done by concentration and dehydration, addition of an organic solvent, etc. to prepare the coating liquid comprising gold-containing noble metal microparticles (gold-coated silver microparticles) of the present invention.

Moreover, the following method (first production method) can be used to form the transparent 2-layered film that consists of a transparent conductive layer and transparent coating layer on a transparent substrate:

That is, a coating liquid for forming a transparent conductive layer whose main components are a solvent and gold microparticles or gold-containing noble metal microparticles with an mean particle diameter of 1 to 100 nm dispersed in this solvent is applied to a transparent substrate (this substrate comprises, for instance, the front panel of CRTs and PDPs), such as a glass substrate or plastic substrate, etc., by a method such as spray coating, spin coating, wire bar coating, doctor blade coating, gravure coating, roller coating, etc., and dried when necessary. Then a coating liquid for forming a transparent coating layer whose main components are a functional group-containing compound having at least one functional group selected from mercapto groups (—SH), sulfide groups (—S—), and polysulfide groups (—$S_x$—, X≧2) and binder, such as silica sol, etc., and solvent is over-coated by the above-mentioned means.

Next, after over-coating, heat treatment is performed at a temperature of, for instance, 50 to 350° C. in order to cure the coating liquid for forming a transparent coating layer that was over-coated and form the above-mentioned transparent 2-layered film.

By means of this first production method, the above-mentioned silica sol that was over-coated seeps into the holes in the network structure of the gold microparticle or gold-containing noble metal microparticle layer that was pre-formed by the coating liquid for forming a transparent conductive layer whose main component is gold microparticles or gold-containing noble metal microparticles when the coating liquid for forming a transparent coating layer, whose main components are a functional groups-containing compounds having at least one functional group selected from mercapto groups (—SH), sulfide groups (—S—), and polysulfide groups (—$S_x$—, X≧2) and silica sol and solvent, is over-coated by the above-mentioned method. The silica sol becomes a binder matrix that contains as its main component silicon oxide and that comprises at least one functional group selected from mercapto groups (—SH), sulfide groups (—S—), and polysulfide groups (—$S_x$—, X≧2) with the above-mentioned heat treatment. Moreover, in the end, improvement of conductivity, improvement of film strength, and even further improvement of weather resistance are simultaneously accomplished by the firm bonding between this binder matrix with the substrate and the gold microparticles or gold-containing noble metal microparticles.

Moreover, with respect to the optical constants (n–ik) of the transparent conductive layer wherein the above-mentioned gold microparticles or gold-containing noble metal microparticles have been dispersed in a binder matrix containing silicon oxide as its main component and at least one functional group selected from mercapto groups (—SH), sulfide groups (—S—), and polysulfide groups (—$S_x$—, x≧2), the index of refraction n is not that large, but the extinction coefficient is large and therefore, reflectance of the transparent 2-layered film can be markedly reduced because of the structure of the transparent 2-layered film made from the above-mentioned transparent conductive layer and transparent coating layer.

Moreover, with respect to the transmitted light ray profile of the above-mentioned transparent 2-layered film, for instance, the standard deviation of transmittance of the transparent 2-layered film only not comprising the transparent substrate is small at 1 to 2% at each wavelength in 5 nm intervals in the visible light wavelength range (380 to 780 nm) and an extremely flat transmission profile (refer to FIG. 2) is obtained.

Furthermore, the same excellent properties as when the binder matrix comprises the above-mentioned functional groups are obtained in terms of reflection and transmission properties of the above-mentioned transparent 2-layered film when a binder matrix contains silicon oxide as its main component and does not comprise the functional groups of mercapto groups (—SH), sulfide groups (—S—), polysulfide groups (—$S_x$—, x≧2), etc. The reason for this apparently is that there is almost no change in the optical constants of the binder matrix, even when functional groups such as mercapto groups (—SH), sulfide groups (—S—), polysulfide groups (—$S_x$—, x≧2), etc., are introduced to a binder matrix whose main component is silicon oxide.

The mixture ratio of binder, such as silica sol, etc., and functional group-containing compound having at least one functional group selected from mercapto groups (—SH), sulfide groups (—S—), and polysulfide groups (—$S_x$—, x≧2) in the above-mentioned coating liquid for forming a transparent coating layer is 0.1 to 50 parts by weight, preferably 0.5 to 15 parts by weight, functional group-containing compound per 100 parts by weight binder. The effects of the above-mentioned functional groups will not be sufficient if there is less than 0.1 part by weight functional group-containing compound, while if there is more than 50 parts by weight, there will be a reduction in the strength of the binder matrix itself. Furthermore, this requirement is the same when a resin binder is used and when an inorganic binder is used.

Moreover, the silica sol comprising a functional group-containing compound used in the coating liquid for forming a transparent coating layer can be a polymer wherein hydrolysis and dehydropolycondensation have proceeded as a result of adding water and acid catalyst to a functional group-containing silicon compound (functional group-containing compound), such as γ-mercaptopropyltrimethoxysilane, γ-mercaptopropylmethyl-dimethoxysilane, 3-(2-acetoxyethylthiopropyl)dimethoxymethylsilane, bis(triethoxysilylpropyl)tetrasulfane, etc., and orthoalkylsilicate, or a polymer (silica sol) wherein further hydrolysis and dehydropolycondensation have proceeded as a result of adding water and acid catalyst to a commercial alkyl silicate solution polymerized to a tetramer or pentamer and to which the above-mentioned functional group-containing silicon compound has then been added.

Furthermore, the alkoxysilyl group segment of the above-mentioned functional group-containing silicon compound hydrolyzes in several hours to several days when it is added to the silica sol. However, it is preferred that the above-mentioned coating liquid for forming the transparent coating layer be used after this hydrolysis. Moreover, when dehydropolycondensation proceeds, the viscosity of the solution rises until it eventually hardens and therefore, the degree of dehydropolycondensation is adjusted to no more than the upper limit in terms of viscosity with which coating on a transparent substrate, such as a glass substrate or plastic substrate, etc., is possible. However, there are no special restrictions to the degree of dehydropolycondensation as long as it is no higher than this level.

In addition, alkyl silicate hydrolysis polymer comprising a functional group-containing compound having at least one functional group selected from mercapto groups (—SH), sulfide groups (—S—), and polysulfide groups (—$S_x$—, $x \geq 2$) all but completes dehydropolycondensation when the transparent 2-layered film is heated and baked to become a cured silicate film containing as its main component silicon oxide and comprising at least one functional group selected from mercapto groups (—SH), sulfide groups (—S—), and polysulfide groups (—$S_x$—, $x \geq 2$).

Furthermore, it is possible to adjust the index of refraction of the transparent coating layer and change reflectance of the transparent 2-layered film by adding magnesium fluoride microparticles, alumina sol, titania sol, zirconia sol, etc., to the silica sol comprising a functional group-containing compound having at least one functional group selected from mercapto groups (—SH), sulfide groups (—S—), and polysulfide groups (—$S_x$—, $x \geq 2$).

Moreover, it is also possible to use a coating liquid for forming a transparent conductive layer that is a mixture of silica sol as the inorganic binder component comprising the binder matrix in addition to solvent and gold microparticles or gold-containing noble metal microparticles with an mean particle diameter of 1 to 100 nm dispersed in this solvent during the process of forming the above-mentioned transparent conductive layer. In this case, the coating liquid for forming a transparent conductive layer that comprises the above-mentioned silica sol is applied and dried when necessary and then the same transparent 2-layered film is obtained by over-coating the above-mentioned coating liquid for forming a transparent coating layer by the above-mentioned methods.

Furthermore, a coating liquid for forming a transparent conductive layer in which polymer resin has been mixed can be used in the first production method. When a polymer resin is added, the gold microparticles or gold-containing noble metal microparticles in the coating liquid for forming a transparent conductive layer are stabilized and the pot life of the coating liquid for forming a transparent conductive layer can be prolonged. However, there is a tendency toward slight deterioration of the strength and weather resistance of the transparent conductive film that is obtained and therefore, precautions must be taken when using a polymer resin.

Next, the transparent conductive layered structure of the present invention can also be obtained by the following second production method:

That is, a coating liquid for forming a transparent conductive layer whose main components are a solvent and gold microparticles or gold-containing noble metal microparticles with an mean particle diameter of 1 to 100 nm and a functional group-containing compound having at least one functional group selected from mercapto groups (—SH), sulfide groups (—S—), and polysulfide groups (—$S_x$—, $x \geq 2$) dispersed in this solvent is applied to a transparent substrate (this substrate comprises, for instance, the front panel of CRTs and PDPs), such as a glass substrate or plastic substrate, etc., by a method such as spray coating, spin coating, wire bar coating, doctor blade coating, gravure coating, roller coating, etc., and dried when necessary. Then a coating liquid for forming a transparent coating layer whose main components are a binder, such as silica sol, etc., and solvent is over-coated by the above-mentioned means.

Next, after over-coating, heat treatment is performed at a temperature of, for instance, 50 to 350° C. in order to cure the coating liquid for forming a transparent coating layer that was over-coated and form the above-mentioned transparent 2-layered film.

By means of this production method, as with the first production method, the above-mentioned binder, such as silica sol, etc., that was over-coated seeps into the holes in the network structure of the gold microparticle or gold-containing noble metal microparticle layer that was pre-formed by the coating liquid for forming a transparent conductive layer whose main components are gold microparticles or gold-containing noble metal microparticles and functional group-containing compound when the coating liquid for forming a transparent coating layer is over-coated. This silica sol becomes a binder matrix that contains as its main component silicon oxide and that comprises at least one functional group selected from mercapto groups (—SH), sulfide groups (—S—), and polysulfide groups (—$S_x$—, $X \geq 2$) with the above-mentioned heat treatment. Furthermore, the ratio at which the binder that has seeped into the holes of the above-mentioned network structure and functional group-containing compound in the network structure is confirmed by the inventors' observations in the end to be approximately the same as the ratio of binder and functional group-containing compound in the coating liquid for forming a transparent coating layer in the first production method.

In addition, the coating liquid for forming a transparent conductive layer of the present invention used in the above-mentioned second production method can be made by, for instance, the following method:

That is, a colloidal dispersion of silver microparticles is prepared by the above-mentioned method [for instance, the Carey-Lea method, Am. J. Sci., 37, 47 (1889), Am. J. Sci., 38 (1889)]. For example, a colloidal dispersion of silver microparticles (Ag: 0.1 to 10 wt %) can be easily prepared by adding and reacting a mixture of aqueous iron sulfate (II) solution and an aqueous sodium citrate solution with an aqueous silver nitrate solution, filtering and washing the precipitate, and then adding pure water.

Next, a reduction agent such as hydrazine, etc., is added to the colloidal dispersion of silver microparticles that was obtained and a mixture of an aurate solution and a functional group-containing compound having at least one functional group selected from mercapto groups (—SH), sulfide groups (—S—), and polysulfide groups (—S$_x$—, X≧2) [for instance, γ-mercaptopropyltrimethoxysilane, γ-mercaptopropylmethyldimethoxysilane, 3-(2-acetoxyethylthiopropyl)dimethoxymethylsilane, bis (triethoxysilylpropyl)tetrasulfane, thiomalic acid, thiosalicylic acid, thiodiglycolic acid, etc.] is further mixed. As a result, a colloidal dispersion can be obtained in which gold-containing noble metal microparticles (gold-coated silver microparticles) and functional group-containing compound are dispersed.

Furthermore, with respect to the timing for adding the functional group-containing compound to the above-mentioned colloidal dispersion of silver microparticles, the above-mentioned compound can be added at a time other than coating, whereby the above-mentioned compound is added simultaneously with the aurate solution. It can be added after the coating treatment whereby the surface of the silver microparticles is coated with gold. However, the functional group-containing compound having at least one functional group selected from mercapto groups (—SH), sulfide groups (—S—), and polysulfide groups (—S$_x$—, X≧2) should not be mixed alone in the colloidal dispersion of silver microparticles before the coating treatment with gold. This is because if the above-mentioned compound is mixed alone, sufficient coating cannot be realized by performing coating treatment with gold after and a dispersion of silver microparticles that are well coated with gold cannot be obtained. The reason for this is apparently that the surface of the silver microparticles is coated by the above-mentioned command having mercapto groups (—SH), sulfide groups (—S—), or polysulfide groups when the above-mentioned compound has been mixed alone.

Next, the electrolyte concentration of the colloidal dispersion in which gold-containing noble metal microparticles (gold-coated silver microparticles) and functional group-containing compound have been dispersed must be reduced by a desalination treatment method, such as dialysis, electrodialysis, ion exchange, ultrafiltration, etc. This is because the colloid will generally aggregate with the electrolyte if the electrolyte concentration is not reduced, as in the first production method.

Then, the colloidal dispersion of gold-containing noble metal microparticles (gold-coated silver microparticles) that has undergone the above-mentioned desalination treatment is concentrated by a reduced-pressure evaporator or a method such as ultrafiltration, etc., to obtain a concentrated dispersion of functional group-containing compound having mercapto groups (—SH), sulfide groups (—S—), and polysulfide groups (—S$_x$—, X≧2) and gold-containing noble metal microparticles (gold-coated silver microparticles). The coating liquid for forming the transparent conductive layer of the present invention used in the second production can then be obtained by mixing solvent only, or solvent comprising binder, with this concentrated dispersion and performing component adjustment (microparticle concentration, water content concentration, etc.).

This transparent conductive layered structure of the present invention has a transparent conductive layer whose main components are gold microparticles or gold-containing noble metal microparticles with an mean particle diameter of 1 to 100 nm and a binder matrix comprising at least one functional group selected from mercapto groups (—SH), sulfide groups (—S—), and polysulfide groups (—S$_x$—, X≧2) and therefore, it has excellent film strength and weather resistance when compared to the transparent conductive layer of conventional transparent conductive base materials, and it has good conductivity and excellent anti-reflection effects and a transmission profile.

Consequently, it is possible to use this layer for the front panel, etc., of displays, such as CRTs, PDPs, fluorescent display tubes (VFDs), filed emission displays (FEDs), electroluminescence displays (ELDs), liquid crystal displays (LCDs), etc.

Moreover, the coating liquid for forming a transparent coating layer used in the first production method contains as its main components, solvent, binder and a functional group-containing compound having at least one functional group selected from mercapto groups (—SH), sulfide groups (—S—), and polysulfide groups (—S$_x$—, X≧2) and the mixture ratio of binder and above-mentioned functional group-containing compound is set at 0.1 to 50 parts by weight functional group-containing compound per 100 parts by weight binder and therefore, it is possible to obtain a transparent conductive layered structure having excellent film strength and weather resistance when compared to transparent conductive layered structures that use conventional coating liquids for forming transparent coating layers.

Furthermore, the coating liquid for forming a transparent conductive layer used in the second production method contains as its main components a solvent and gold microparticles or gold-containing noble metal microparticles, which contain 5 wt % or more of gold, having an mean particle diameter of 1 to 100 nm and a functional group-containing compound having at least one functional group selected from mercapto groups (—SH), sulfide groups (—S—), and polysulfide groups (—S$_x$—, X≧2) dispersed in this solvent and therefore, it is possible to obtain a transparent conductive layered structure having a transparent conductive layer with excellent film strength and weather resistance when compared to transparent conductive layered structures that use conventional coating liquids for forming transparent conductive layers.

Examples of the present invention will be described below in specific terms. However, the present invention is not limited to these examples. Moreover, the "%" in the text refer to "wt %," with the exception of transmission, reflectance and haze value (%). Moreover, the "parts" refer to "parts by weight."

EXAMPLE 1

A colloidal dispersion of silver microparticles was prepared by the above-mentioned Carey-Lea method. Specifically, after adding a mixture of 39 g aqueous 23% iron sulfate (II) solution and 48 g aqueous 37.5% sodium citrate solution to 33 g aqueous 9% silver nitrate solution, the precipitate was filtered and washed. Then pure water was added to prepare a colloidal dispersion of silver microparticles (Ag: 0.15%).

Next, 8.0 g aqueous 1% hydrazine monohydrate (N$_2$H$_4$.H$_2$O) solution and a mixture of 480 g aqueous potassium aurate [KAu(OH)$_4$] solution (Au: 0.075%) and 0.2 g aqueous 1% polymer dispersant solution were added to 60 g of this colloidal dispersion of silver microparticles while agitating to obtain a colloidal dispersion of gold-coated silver microparticles (gold-containing noble metal microparticles).

Once desalting of this colloidal dispersion of gold-coated silver microparticles (gold-containing noble metal microparticles) was performed with an ion-exchange resin (Diaion SK1B, SA20AP; brand names of Mitsubishi Chemical Corporation), the product was concentrated by ultrafiltration. Ethanol (EA) and diacetone alcohol (DAA) were added to obtain a coating liquid for forming a transparent conductive layer (Ag: 0.08%, Au: 0.32%, water: 10.7%, EA: 83.9%, DAA: 5.0%).

As a result of observing the coating liquid for forming a transparent conductive layer that was obtained under a transmission electron microscope, the mean particle diameter of the gold-coated silver microparticles (gold-containing noble metal microparticles) was 5.8 nm.

Next, the coating liquid for forming a transparent conductive layer was spin coated (150 rpm, 120 seconds) onto a glass substrate (soda lime glass with a thickness of 3 mm) that had been heated to 35° C. The coating liquid for forming a transparent coating layer that is discussed below was then spin coated (150 rpm, 60 seconds) and the product was further cured for 20 minutes at 180° C. to obtain a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 1.

Furthermore, there is a possibility of an alloy layer forming as a result of heat diffusion of the gold and silver of the gold-coated silver microparticles when the above-mentioned heat treatment is performed for 20 minutes at 180° C. and there are cases wherein the coating layers of the above-mentioned gold-coated silver microparticles are not made of gold alone. Therefore, in the present specification the microparticles comprising gold and silver in the transparent conductive layer of a completed transparent conductive layered structure are represented not as gold-coated silver particles, but rather, gold-and-silver 2-component-type microparticles (gold-containing noble metal microparticles), as previously mentioned, when gold-coated silver microparticles are used in the coating liquid for forming a transparent conductive layer.

The silica sol comprising a functional group-containing compound that makes up the above-mentioned coating liquid for forming a transparent coating layer here is obtained by preparing a substance with an $SiO_2$ (silicon oxide) solid content concentration of 10% and a weight-average molecular weight of 2,070 using 17.4 parts Methyl Silicate 51 (Colcoat Co., brand name), 3.6 parts γ-mercaptopropyl-trimethoxysilane, 56.3 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content concentration of 0.8%.

Moreover, film properties of the transparent 2-layer film formed on the glass substrate (surface resistance, visible light ray transmittance, standard deviation of transmittance, haze value, bottom reflectance/bottom wavelength) are shown in Table 1b.

Furthermore, above-mentioned bottom reflectance means minimum reflectance in the reflection profile of the transparent conductive layered structure, and bottom wavelength means the wavelength when reflectance is at its minimum.

Figure 1:
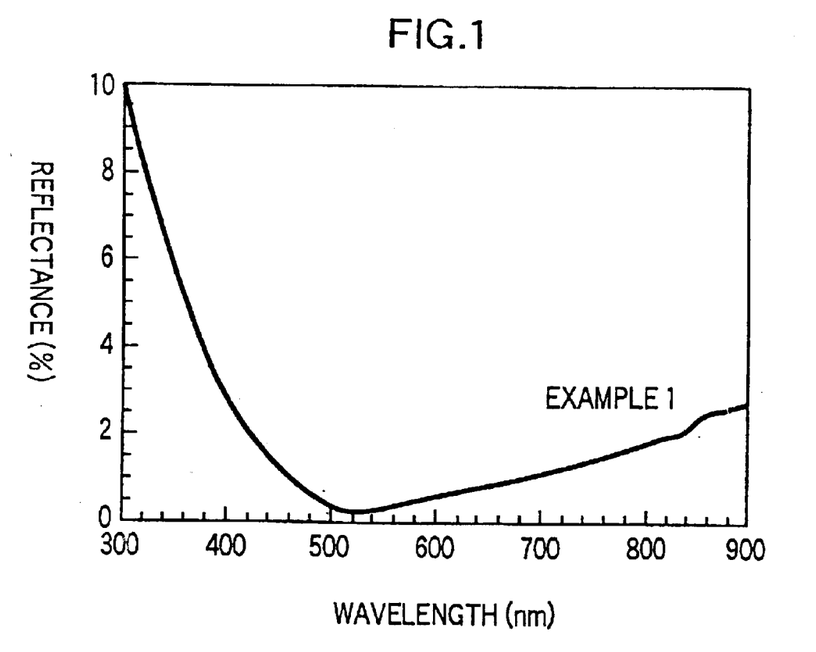
FIG. 1 is a graph showing the reflection profile of the transparent conductive layered structure of Example 1.
Figure 2:
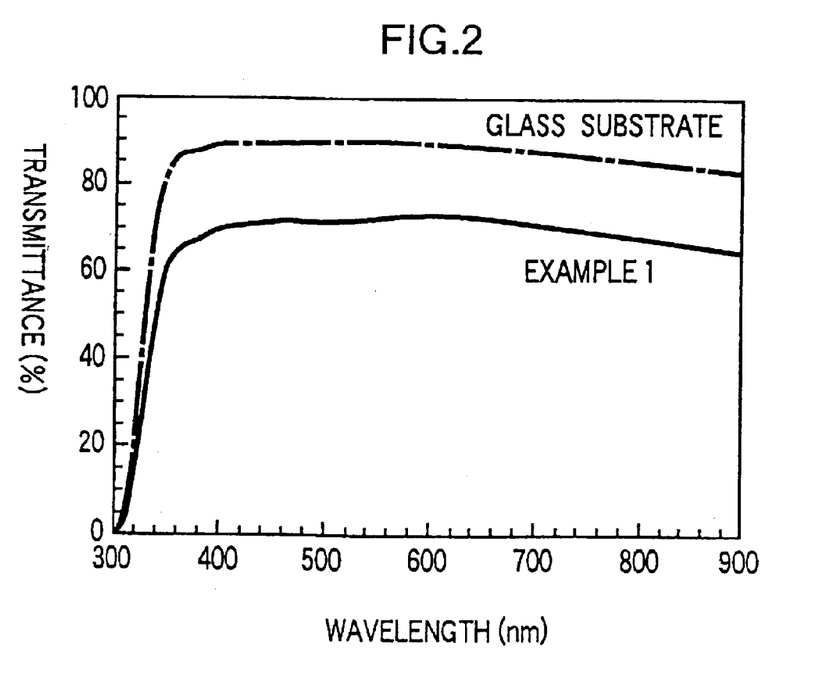
FIG. 2 is a graph showing the transmission profile of the transparent conductive layered structure of Example 1.

Moreover, the reflection profile of the transparent conductive layered structure of Example 1 that was produced is shown in FIG. 1, while the transmission profiles determined inclusive of each substrate are shown together in FIG. 2.

Furthermore, transmittance of the transparent 2-layer film only without the transparent substrate (glass substrate) at each wavelength in 5 nm intervals of the visible light ray wavelength range (380 to 780 nm) in Table 1b is found as follows: That is, Transmittance of transparent 2-layer film only without transparent substrate (%)=[(transmittance determined inclusive of transparent substrate)/(transmittance of transparent substrate)]×100

Unless otherwise noted, here the transmittance of the transparent 2-layered film only not comprising the transparent substrate is used as the transmittance in the present specification.

Moreover, surface resistance of the transparent 2-layer film was determined using the surface resistance meter Loresta AP (MCP-T400) of Mitsubishi Chemical Corporation.

The haze value and visible light ray transmittance were determined using a haze meter (HR-200) made by Murakami Color Research Laboratory.

Reflectance and the reflection and transmission profiles were determined using a spectrophotometer (U-4000) made by Hitachi Ltd. In addition, particle diameter of the gold-containing noble metal microparticles is as evaluated under a transmission electron microscope made by JEOL Ltd.

EXAMPLE 2

Other than the fact that a silica sol with a weight-average molecular weight of 2,460 comprising a functional group-containing compound was obtained using 19.0 parts Methyl Silicate 51 (Colcoat Co., brand name), 1.0 part γ-mercaptopropyl-trimethoxysilane, 57.4 parts ethanol, 7.9 parts aqueous 1% nitric acid solution and 14.7 parts pure water during preparation of the coating liquid for forming a transparent coating layer, a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 2, was obtained in the same manner as in Example 1. The film properties of the transparent 2-layered film formed on the glass substrate are shown in Table 1b below.

EXAMPLE 3

Other than the fact that a coating liquid for forming a transparent conductive layer containing silica binder (Ag: 0.08%, Au: 0.32%, $SiO_2$: 0.02%, water: 10.7%, EA: 83.8%, DAA:5.0%) was obtained by adding the silica sol described below, during the process of solvent dilution for preparation of a coating liquid for forming a transparent conductive layer in Example 1, a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 3, was obtained in the same manner as in Example 1. The film properties of the transparent 2-layered film formed on the glass substrate are shown in Table 1b below.

Moreover, the silica sol added during the above-mentioned process of solvent dilution was obtained by preparing a substance with an $SiO_2$ (silicon oxide) solid content concentration of 10% and a weight-average molecular weight of 4,950 using 19.6 parts Methyl Silicate 51 (Colcoat Co., brand name), 57.8 parts ethanol, 7.9 parts aqueous 1% nitric acid solution, and 14.7 parts pure water and then desalting this with an ion-exchange resin (Diaion SK1B, SA20AP; brand names of Mitsubishi Chemical Corporation).

EXAMPLE 4

Other than the fact that a coating liquid for forming a transparent coating layer was obtained by adding 0.016 parts γ-mercaptopropyltrimethoxysilane to 100 parts of the silica sol described below, a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 4, was obtained in the same manner as in Example 1. The film properties of the transparent 2-layered film formed on the glass substrate are shown in Table 1b below.

The above-mentioned silica sol is obtained by preparing a substance with an $SiO_2$ (silicon oxide) solid content concentration of 10% and a weight-average molecular weight of 1,190 using 19.6 parts Methyl Silicate 51 (Colcoat Co., brand name), 57.8 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content concentration of 0.8%.

EXAMPLE 5

Other than the fact that a coating liquid for forming a transparent conductive layer (Ag: 0.13%, Au: 0.27%, water: 10.7%, EA: 83.9%, DAA: 5.0%) was obtained by varying the conditions of mixing the starting materials in the process of producing a colloidal dispersion of gold-coated silver microparticles (gold-containing noble metal microparticles) in Example 1, a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 5, was obtained in the same manner as in Example 4. The film properties of the transparent 2-layered film formed on the glass substrate are shown in Table 1b below.

EXAMPLE 6

Other than the fact that a coating liquid for forming a transparent coating layer was obtained by adding 0.004 part γ-mercaptopropyltrimethoxysilane to 100 parts of the silica sol, a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 6, was obtained in the same manner as in Example 4. The film properties of the transparent 2-layered film formed on the glass substrate are shown in Table 1b below.

EXAMPLE 7

Other than the fact that 0.01 part acrylic polymer resin was added to 100 parts of the coating liquid for forming a transparent conductive layer in Example 1, a glass substrate with a transparent 2-layer film consisting of a transparent conductive layer made of gold-containing noble metal microparticles, a polymer resin and a binder matrix comprising mercapto groups and a transparent coating layer composed of silicate film containing as its main component silicon oxide and containing mercapto groups, that is, the transparent conductive layered structure of Example 7, was obtained in the same manner as in Example 4. The film properties of the transparent 2-layered film formed on the glass substrate are shown in Table 1b below.

EXAMPLE 8

Other than the fact that a coating liquid for forming a transparent coating layer was obtained by adding 0.016 part γ-mercaptopropylmethyldimethoxysilane to 100 parts of the silica sol in Example 4, a glass substrate with a transparent 2-layer film consisting of a transparent conductive layer made of gold-containing noble metal microparticles, polymer resin and a binder matrix comprising mercapto groups and a transparent coating layer composed of silicate film containing as its main component silicon oxide and containing mercapto groups, that is, the transparent conductive layered structure of Example 8, was obtained in the same manner as in Example 7. The film properties of the transparent 2-layered film formed on the glass substrate are shown in Table 1b below.

EXAMPLE 9

Other than the fact that a coating liquid for forming a transparent coating layer was obtained by adding 0.016 part 3-(-2-acetoxyethylthiopropyl)dimethoxymethyl silane to 100 parts of the silica sol in Example 4, a glass substrate with a transparent 2-layer film consisting of a transparent conductive layer made of gold-containing noble metal microparticles, polymer resin and a binder matrix comprising sulfide groups and a transparent coating layer composded of silicate film containing as its main component silicon oxide and containing sulfide groups, that is, the transparent conductive layered structure of Example 9, was obtained in the same manner as in Example 7. The film properties of the transparent 2-layered film formed on the glass substrate are shown in Table 1b below

EXAMPLE 10

Other than the fact that a coating liquid for forming a transparent coating layer was obtained by adding 0.016 part bis(triethoxysilylpropyl)tetrasulfane to 100 parts of the silica sol in Example 4, a glass substrate with a transparent 2-layer film consisting of a transparent conductive layer made of gold-containing noble metal microparticles and a binder matrix comprising polysulfide groups and a transparent coating layer composed of silicate film containing as its main component silicon oxide and polysulfide groups, that is, the transparent conductive layered structure of Example 10, was obtained in the same manner as in Example 7. The film properties of the transparent 2-layered film formed on the glass substrate are shown in Table 1b below.

EXAMPLE 11

Other than the fact that a coating liquid for forming a transparent conductive layer (Ag: 0.24%, Au: 0.96%, water: 16.0%, EA:72.8%, NBA: 5.0%, DAA: 5.0%) was prepared by adding ethanol (EA), 1-butanol (NBA), and diacetone alcohol (DAA) to a concentrated liquid of the colloidal dispersion of gold-coated silver microparticles (gold-containing noble metal microparticles) in Example 1, and this coating liquid for forming a transparent conductive layer was spin coated (120 rpm, 120 seconds) on a glass substrate that had been heated to 40° C., a glass substrate with a transparent 2-layer film consisting of a transparent conductive layer made of gold-containing noble metal microparticles and a binder matrix comprising mercapto groups and a transparent coating layer composed of silicate film containing as its main component silicon oxide and containing mercapto groups, that is, the transparent conductive layered structure of Example 11, was obtained in the same manner as in Example 6. The film properties of the transparent 2-layered film formed on the glass substrate are shown in Table 1b below Comparative Example 1

Other than the fact that the silica sol described below was used as the coating liquid for forming a transparent coating layer in Example 1, a glass substrate with a transparent 2-layer film consisting of a transparent conductive layer made of gold-containing noble metal microparticles and a binder matrix of silicon oxide and a transparent coating layer composed of silicate film containing as its main component silicon oxide, that is, the transparent conductive layered structure of Comparative Example 1, was obtained in the same manner as in Example 1. The film properties of the transparent 2-layered film formed on the glass substrate are shown in Table 1b below.

The above-mentioned silica sol was obtained by preparing a substance with an $SiO_2$ (silicon oxide) solid content concentration of 10% and a weight-average molecular weight of 1,920 using 19.6 parts Methyl Silicate 51 (Colcoat Co., brand name), 57.8 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content concentration of 0.8%.

Comparative Example 2

Other than the fact that the silica sol in Example 4 was used as the coating liquid for forming a transparent coating layer, a glass substrate with a transparent 2-layer film consisting of a transparent conductive layer made of gold-containing noble metal microparticles, polymer resin and a binder matrix of silicon oxide and a transparent coating layer composed of silicate film containing as its main component silicon oxide that is, the transparent conductive layered structure of Comparative Example 2, was obtained in the same manner as in Example 7. The film properties of the transparent 2-layered film formed on the glass substrate are shown in Table 1b below.

TABLE 1a

| | | | | Coating liquid for forming a transparent coating layer | | |
| --- | --- | --- | --- | --- | --- | --- |
| | | | | Functional group-containing compound | | Mixture ratio (Note 2) |
| | Type of microparticle | Gold content | Binder | Functional group | Alkoxysilyl group (Note 1) | |
| Example 1 | Ag—Au | 80 wt. % | Silica sol | —SH | —Si(OR)$_3$ | 1/2.5 |
| Example 2 | Ag—Au | 80 wt. % | Silica sol | —SH | —Si(OR)$_3$ | 1/9.7 |
| Example 3 | Ag—Au | 80 wt. % | Silica sol | —SH | —Si(OR)$_3$ | 1/2.5 |
| Example 4 | Ag—Au | 80 wt. % | Silica sol | —SH | —Si(OR)$_3$ | 1/50 |
| Example 5 | Ag—Au | 68 wt. % | Silica sol | —SH | —Si(OR)$_3$ | 1/50 |
| Example 6 | Ag—Au | 80 wt. % | Silica sol | —SH | —Si(OR)$_3$ | 1/200 |
| Example 7 | Ag—Au | 80 wt. % | Silica sol | —SH | —Si(OR)$_3$ | 1/50 |
| Example 8 | Ag—Au | 80 wt. % | Silica sol | —SH | —SiR(OR)$_2$ | 1/50 |
| Example 9 | Ag—Au | 80 wt. % | Silica sol | —S— | —Si(OR)$_3$ | 1/50 |
| Example 10 | Ag—Au | 80 wt. % | Silica sol | —S$_4$— | —Si(OR)$_3$ | 1/50 |
| Example 11 | Ag—Au | 80 wt. % | Silica sol | —SH | —Si(OR)$_3$ | 1/200 |
| Comparative Example 1 | Ag—Au | 80 wt. % | Silica sol | — | — | — |
| Comparative Example 2 | Ag—Au | 80 wt. % | Silica sol | — | — | — |

Note1:
R is a methyl group or ethyl group.
Note 2:
Parts by weight of functional group-containing compound/parts by weight silicon oxide binder.

TABLE 1b

|  | Surface resistance (Ω/□) | Visible light transmittance (%) | Standard deviation of transmittance (Note 3) | Haze value (%) | Bottom reflectance (%)/bottom wavelength (nm) |
|---|---|---|---|---|---|
| Example 1 | 225 | 80.4 | 1.05 | 0.1 | 0.26/525 |
| Example 2 | 215 | 80.4 | 1.12 | 0.1 | 0.29/535 |
| Example 3 | 245 | 81.1 | 1.10 | 0.2 | 0.34/540 |
| Example 4 | 209 | 80.8 | 1.26 | 0.1 | 0.18/535 |
| Example 5 | 230 | 81.9 | 1.38 | 0.1 | 0.20/540 |
| Example 6 | 221 | 82.3 | 1.34 | 0.1 | 0.28/545 |
| Example 7 | 235 | 81.2 | 1.19 | 0.1 | 0.22/540 |
| Example 8 | 289 | 81.8 | 1.22 | 0 | 0.32/535 |
| Example 9 | 293 | 81.5 | 1.40 | 0.1 | 0.21/530 |
| Example 10 | 318 | 81.5 | 1.41 | 0.1 | 0.24/535 |
| Example 11 | 33 | 51.4 | 2.51 | 0.1 | 0.87/490 |
| Comparative Example 1 | 230 | 80.3 | 1.25 | 0.1 | 0.27/545 |
| Comparative Example 2 | 241 | 81.3 | 1.15 | 0.1 | 0.31/540 |

Note 3:
Value to transmittance (%) of transparent 2-layered film only, not including the transparent substrate, at each wavelength in 5 nm intervals in the visible light wavelength range (380 to 780 nm).

[Weather Resistance Test 1]

The transparent conductive layered structures of Examples 1 to 3 and the transparent conductive layered structures of Comparative Example 1 were placed for 3 months under conditions of exposure to direct sunlight and rain outdoors and then the surface resistance and film appearance of the transparent 2-layered film on the transparent substrate (glass substrate) were checked. The results are shown in Table 2.

TABLE 2

|  | Surface resistance (Ω/□) | | 2-Layered surface appearance |
|---|---|---|---|
|  | Initial value | Value after being outdoors for 3 months |  |
| Example 1 | 225 | No change in surface resistance | No change |
| Example 2 | 215 | No change in surface resistance | No change |
| Example 3 | 245 | No change in surface resistance | No change |
| Comparative Example 1 | 230 | 385 | No change |

[Weather Resistance Test 2]

The transparent conductive layered structures of Examples 4 to 11 and the transparent conductive layered structure of Comparative Example 2 were checked for surface resistance and film appearance of the transparent 2-layered film formed on a transparent substrate using an ultraviolet irradiation accelerated testing device (Eye Super UV Tester, SUV-W131, Iwasaki Electric Co., Ltd., ultraviolet radiation intensity: 100 mW/cm$^2$). The results are shown in Table 3.

TABLE 3

|  | Surface resistance (Ω/□) | | 2-Layered film appearance |
|---|---|---|---|
|  | Initial value | Value after ultraviolet cumulative radiation of 150 kJ/cm$^2$ |  |
| Example 4 | 209 | 173 | No change |
| Example 5 | 230 | 192 | No change |
| Example 6 | 221 | 199 | No change |
| Example 7 | 235 | 201 | No change |
| Example 8 | 289 | 287 | No change |
| Example 9 | 293 | 331 | No change |
| Example 10 | 318 | 349 | No change |
| Example 11 | 33 | 31 | No change |
| Comparative Example 2 | 241 | 433 | No change |

[Film Strength Tests]

Rubber eraser tests (the film surface was continuously rubbed back and forth 50 and 100 times with a rubber eraser under a load of 1 kg and then checked for scratches) were performed on the transparent conductive layered structures in Examples 1 to 3 and the transparent conductive layered structure in Comparative Example 1 and the film strength of the transparent 2-layered film on the transparent substrate (glass substrate) was checked. The results are shown in Table 4. The evaluation criteria in Table 4 are ○: no scratches, Δ: some scratches, and ×: many scratches.

TABLE 4

|  | Back and forth 50 [times under] 1 kg | Back and forth 100 [times under] 1 kg |
|---|---|---|
| Example 1 | ○ | Δ |
| Example 2 | ○ | Δ |
| Example 3 | ○ | Δ |
| Comparative Example 1 | Δ | X |

[Evaluation criteria]
○: no scratches,
Δ: some scratches, and
X: many scratches.

[Evaluation]

1. As is clear from the results in Table 1b, the values of surface resistance (Ω/□) and standard deviation in transmittance of the transparent 2-layered films of each example are similarly much better properties than the values of the transparent 2-layered film of each comparative example. Moreover, as is clear from the transmission profile of the transparent conductive layered structure of Example 1, which is shown in FIG. 2, it is also confirmed that a very flat transmission profile is obtained with the transparent conductive layered structure of Example 1. Further, as is clear from the reflection profile in FIG. 1, it is also confirmed that the transparent conductive layered structure of Example 1 has excellent reflection properties in the visible light wavelength range.

2. In addition, as is clear from the results shown in Tables 2 and 3, in contrast to the fact that the surface resistance of the transparent 2-layered films of Comparative Examples 1 and 2 changes, it is confirmed that weather resistance of the transparent 2-layered films in each example is markedly improved with almost no change in surface resistance of the transparent 2-layered film.

3. Furthermore, as is clear from the results in Table 4, it is confirmed that the strength of the transparent 2-layered film in Examples 1 to 3 is improved when compared to the transparent 2-layered film in Comparative Example 1.

4. Incidentally, gold-and-silver 2-component-type microparticles (gold-containing noble metal microparticles) were used as the metal microparticles in each example and comparative example, but tests are also being conducted using gold microparticles in place of the gold-containing noble metal microparticles and it is being confirmed that the same evaluation as in each example is obtained when gold microparticles are used as the metal microparticles.

EXAMPLE 12

A colloidal dispersion of silver microparticles was prepared by the above-mentioned Carey-Lea method. Specifically, after adding a mixture of 39 g aqueous 23% iron sulfate (II) solution and 48 g aqueous 37.5% sodium citrate solution to 33 g aqueous 9% silver nitrate solution, the precipitate was filtered and washed. Then pure water was added to prepare a colloidal dispersion of silver microparticles (Ag: 0.15%). Next, 10.0 g of an aqueous 1% hydrazine monohydrate ($N_2H_4 \cdot H_2O$) solution was added to 80 g of this colloidal dispersion of silver microparticles. A mixture of 320 g aqueous potassium aurate [$KAu(OH)_4$] solution (Au: 0.15%) and 0.6 g aqueous 1% thiomalic acid solution were added while agitating to obtain a colloidal dispersion of thiomalic acid and gold-coated silver microparticles (gold-containing noble metal microparticles).

Once desalting of this colloidal dispersion of thiomalic acid and gold-coated silver microparticles (gold-containing noble metal microparticles) was performed with an ion-exchange resin (Diaion SK1B, SA20AP; brand names of Mitsubishi Chemical Corporation), the product was concentrated by ultrafiltration. Ethanol (EA) and diacetone alcohol (DAA) were added to obtain a coating liquid for forming a transparent conductive layer (Ag: 0.06%, Au: 0.25%, thiomalic acid: 0.003%, water: 9.7%, DAA: 10.0%, EA: 79.9%). As a result of observing the coating liquid for forming a transparent conductive layer that was obtained under a transmission electron microscope, the mean particle diameter of the gold-coated silver microparticles (gold-containing noble metal microparticles) was 7.8 nm.

Next, the coating liquid for forming a transparent conductive layer was spin coated (150 rpm, 60 seconds) onto a glass substrate (soda lime glass with a thickness of 3 mm) that had been heated to 35° C. A coating liquid for forming a transparent coating layer consisting of silica sol was then spin coated (150 rpm, 60 seconds) and the product was further cured for 20 minutes at 200° C. to obtain a glass substrate with a transparent 2-layer film consisting of a transparent conductive layer made of gold-and-silver 2-component-type microparticles (gold-containing noble metal microparticles) and a binder matrix comprising mercapto groups and a transparent coating layer composed of silicate film containing as its main component silicon oxide, that is, the transparent conductive layered structure of Example 12.

The above-mentioned silica sol is obtained by preparing a substance with an $SiO_2$ (silicon oxide) solid content concentration of 10% and a weight-average molecular weight of 2,850 using 19.6 parts methyl silicate 51 (Colcoat Co., brand name), 57.8 parts ethanol, 7.9 parts aqueous 1% nitric acid solution, and 14.7 parts pure water and then diluting this with a mixture of isopropyl alcohol (IPA) and n-butanol (NBA) (IPA/NBA=3/1) to a final $SiO_2$ solid content concentration of 0.8%.

Moreover, film properties of the transparent 2-layer film formed on the glass substrate (surface resistance, visible light ray transmittance, standard deviation of transmittance, haze value, bottom reflectance/bottom wavelength) are shown in Table 5b.

Figure 3:
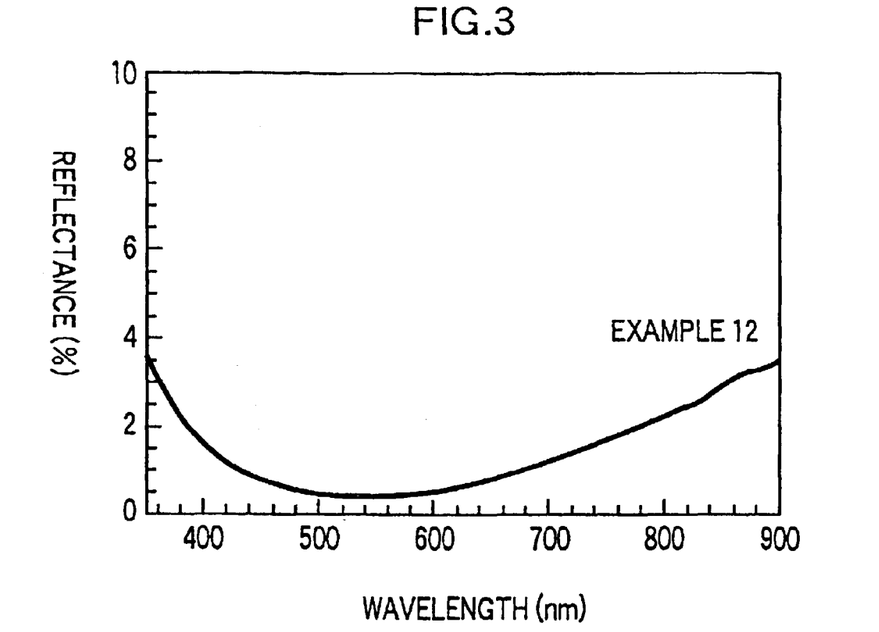
FIG. 3 is a graph showing the reflection profile of the transparent conductive layered structure of Example 12.
Figure 4:
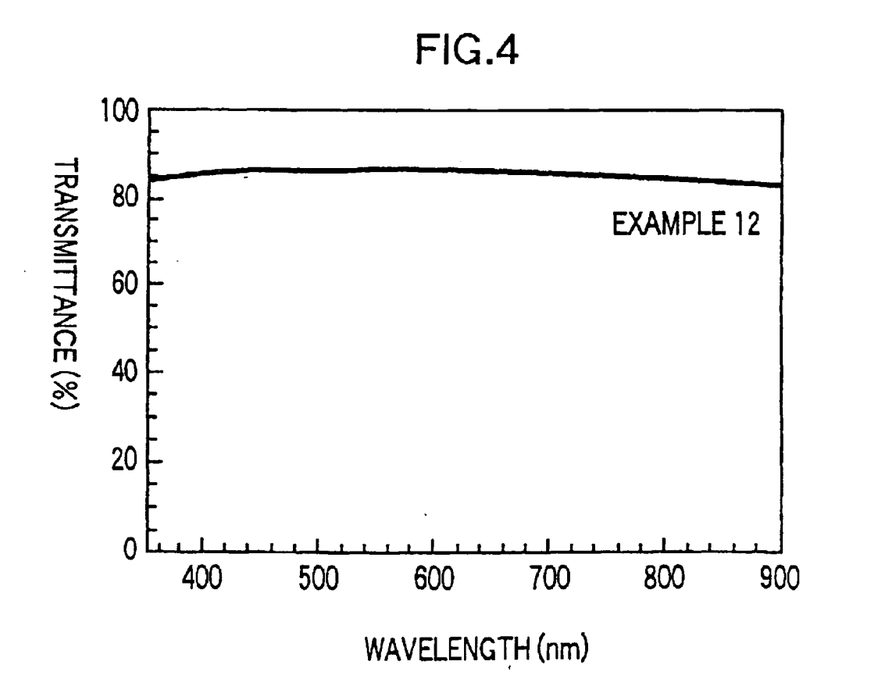
FIG. 4 is a graph showing the transmission profile of the transparent layered structure of Example 12.

In addition, the reflection profile of the transparent conductive layered structure of Example 12 that was produced is shown in FIG. 3, while the transmission profile is shown in FIG. 4.

EXAMPLE 13

Ethanol (EA), diacetone alcohol (DAA) and a tetramer of tetramethyl silicate (Methyl Silicate 51, brand name of Colcoat Co., Ltd.) as inorganic binder were added to a concentrated liquid of the colloidal dispersion in which thiomalic acid and gold-coated silver microparticles (gold-containing noble metal microparticles) were dispersed that had been prepared in Example 12 to obtain a coating liquid for forming a transparent conductive layer comprising thiomalic acid and gold-coated silver microparticles (gold-containing noble metal microparticles) with a mean particle diameter of 7.8 nm (Ag: 0.06%, Au: 0.25%, thiomalic acid: 0.003%, $SiO_2$: 0.01%, water: 9.7%, DAA: 10.0%, EA: 79.9%).

Then, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix comprising mercapto groups and a transparent coating layer composed of silicate film containing as its main component silicon oxide, that is, the transparent conductive layered structure of Example 13, was obtained in the same manner as in Example 12.

The film properties of the transparent 2-layered film formed on the glass substrate are shown in Table 5b below

EXAMPLE 14

The same treatment as in Example 12 was performed using 80 g of colloidal dispersion of silver microparticles prepared by the same method as in Example 12 and 7.0 g of an aqueous 1% solution of hydrazine monohydrate ($N_2H_4 \cdot H_2O$), 240 g of an aqueous solution of potassium aurate [$KAu(OH)_4$] (Au: 0.15%), and 0.16 g of an aqueous 1% solution of sodium thiosalicylate to obtain a coating liquid for forming a transparent conductive layer comprising thiosalicylic acid and gold-coated silver microparticles (gold-containing noble metal microparticles) with a mean particle diameter of 9.1 nm (Ag: 0.08%, Au: 0.22%, thiosalicylic acid: 0.002%, water: 12.1%, DAA: 10.0%, EA: 77.4%).

Thereafter, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix comprising mercapto groups and a transparent coating layer composed of silicate film containing as its main component silicon oxide, that is, the transparent conductive layered structure of Example 14, was obtained in the same manner as in Example 12.

The film properties of the transparent 2-layered film formed on the glass substrate are shown in Table 5b below

EXAMPLE 15

The same treatment as in Example 12 was performed using 80 g of colloidal dispersion of silver microparticles prepared by the same method as in Example 12 and 10.0 g of an aqueous 1% solution of hydrazine monohydrate ($N_2H_4 \cdot H_2O$), 320 g of an aqueous solution of potassium aurate [$KAu(OH)_4$] (Au: 0.15%), and 1.2 g of an aqueous 1% solution of thiodiglycolic acid to obtain a coating liquid for forming a transparent conductive layer comprising thiodiglycolic acid and gold-coated silver microparticles (gold-containing noble metal microparticles) with a mean particle diameter of 8.8 nm (Ag: 0.06%, Au: 0.24%, thiodiglycolic acid: 0.006%, water: 10.2%, DAA: 10.0%, EA: 79.4%).

Then, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix comprising sulfide groups and a transparent coating layer composed of silicate film containing as its main component silicon oxide, that is, the transparent conductive layered structure of Example 15, was obtained in the same manner as in Example 12.

The film properties of the transparent 2-layered film formed on the glass substrate are shown in Table 5b below.

EXAMPLE 16

The same treatment as in Example 12 was performed using 80 g of colloidal dispersion of silver microparticles prepared by the same method as in Example 12 and 10.0 g of an aqueous 1% solution of hydrazine monohydrate ($N_2H_4 \cdot H_2O$), 320 g of an aqueous solution of potassium aurate [$KAu(OH)_4$] (Au: 0.15%), and 0.2 g of an aqueous 1% solution of dithiodiglycolic acid to obtain a coating liquid for forming a transparent conductive layer comprising dithiodiglycolic acid and gold-coated silver microparticles (gold-containing noble metal microparticles) with a mean particle diameter of 7.1 nm (Ag: 0.05%, Au: 0.23%, dithiodiglycolic acid: 0.001%, water: 9.3%, DAA: 10.0%, EA: 80.3%).

Then, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix comprising disulfide groups and a transparent coating layer composed of silicate film containing as its main component silicon oxide, that is, the transparent conductive layered structure of Example 16, was obtained in the same manner as in Example 12.

The film properties of the transparent 2-layered film formed on the glass substrate are shown in Table 5b below.

EXAMPLE 17

The same treatment as in Example 12 was performed using 80 g of colloidal dispersion of silver microparticles prepared by the same method as in Example 12 and 10.0 g of an aqueous 1% solution of hydrazine monohydrate ($N_2H_4 \cdot H_2O$), 320 g of an aqueous solution of potassium aurate [$KAu(OH)_4$] (Au: 0.15%), and 0.6 g of an aqueous 1% solution of γ-mercaptopropyltrimethoxysilane to obtain a coating liquid for forming a transparent conductive layer comprising γ-mercaptopropyltrimethoxysilane (silanol groups [Si—OH] are actually formed when the methoxy groups hydrolyze in the coating liquid) and gold-coated silver microparticles (gold-containing noble metal microparticles) with a mean particle diameter of 8.3 nm (Ag: 0.06%, Au: 0.23%, γ-mercaptopropyltrimethoxysilane: 0.003%, water: 8.6%, DAA: 10.0%, EA: 81.0%).

Then, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix comprising mercapto groups and a transparent coating layer composed of silicate film containing as its main component silicon oxide, that is, the transparent conductive layered structure of Example 17, was obtained in the same manner as in Example 12.

The film properties of the transparent 2-layered film formed on the glass substrate are shown in Table 5b below.

Comparative Example 3

The same treatment as in Example 12 was performed using 80 g of colloidal dispersion of silver microparticles prepared by the same method as in Example 12 and 7.0 g of an aqueous 1% solution of hydrazine monohydrate ($N_2H_4 \cdot H_2O$), 240 g of an aqueous solution of potassium aurate [$KAu(OH)_4$] (Au: 0.15%), and 0.48 g of an aqueous 1% solution of a polymer dispersant to obtain a coating liquid for forming a transparent conductive layer comprising gold-coated silver microparticles (gold-containing noble metal microparticles) with a mean particle diameter of 8.3 nm (Ag: 0.08%, Au: 0.23%, water: 12.0%, DAA: 10.0%, EA: 77.9%).

Then, other than the fact that this coating liquid for forming a transparent conductive layer was used, a glass substrate with a transparent 2-layer film consisting of a transparent conductive layer made of gold-and-silver 2-component-type microparticles (gold-containing noble metal microparticles) and a binder matrix and a transparent coating layer composed of silicate film containing as its main component silicon oxide, that is, the transparent conductive layered structure of Comparative Example 3, was obtained in the same manner as in Example 12.

The film properties of the transparent 2-layered film formed on the glass substrate are shown in Table 5b below.

TABLE 5a

| | Coating liquid for forming a transparent conductive layer | | | |
|---|---|---|---|---|
| | | | Functional group-containing compound | |
| | Type of microparticles | Gold content | Functional group A (Note 1) | Functional group B (Note 2) |
| Example 12 | Ag-Au | 80.6 wt. % | —SH | —COOH |
| Example 13 | Ag-Au | 80.6 wt. % | —SH | —COOH |
| Example 14 | Ag-Au | 73.3 wt. % | —SH | —COOH |
| Example 15 | Ag-Au | 80.0 wt. % | —S— | —COOH |
| Example 16 | Ag-Au | 82.1 wt. % | —S—S— | —COOH |
| Example 17 | Ag-Au | 79.3 wt. % | —SH | —Si(OCH$_3$)$_3$ |
| Comparative Example 3 | Ag-Au | 74.2 wt. % | — | — |

Note 1:
Functional group A is a functional group selected from mercapto groups (—SH), sulfide groups (—S—), and polysulfide groups (—S$_x$—, X ≧ 2).

Note 2:
Functional group B is a functional group that the functional group-containing compound has in addition to above-mentioned functional group A.

TABLE 5b

|  | Surface resistance (Ω/□) | Visible light transmittance (%) | Standard deviation of transmittance (Note 3) | Haze value (%) | Bottom reflectance (%)/bottom wavelength (nm) |
|---|---|---|---|---|---|
| Example 12 | 648 | 87.3 | 0.56 | 0.0 | 0.44/535 |
| Example 13 | 753 | 86.9 | 0.56 | 0.0 | 0.48/520 |
| Example 14 | 726 | 87.0 | 0.58 | 0.1 | 0.45/555 |
| Example 15 | 771 | 87.0 | 0.54 | 0.0 | 0.42/510 |
| Example 16 | 836 | 87.5 | 0.53 | 0.0 | 0.50/505 |
| Example 17 | 925 | 86.7 | 0.62 | 0.0 | 0.49/525 |
| Comparative Example 3 | 2253 | 86.9 | 0.58 | 0.1 | 0.37/515 |

Note 3:
Value to transmittance (%) of a transparent 2-layered film only, not including the transparent substrate, at each wavelength in 5 nm intervals in the visible light wavelength range (380 to 780 nm).

[Weather Resistance Test]

The transparent conductive layered structures of Examples 12 to 17 and the transparent conductive layered structures of Comparative Example 3 were placed for 3 months under conditions of exposure to direct sunlight and rain outdoors and then the surface resistance and film appearance of the transparent 2-layered film on the transparent substrate (glass substrate) were checked. The results are shown in Table 6.

TABLE 6

| | Surface resistance (Ω/□) | | |
|---|---|---|---|
| | Initial value | Value after being outdoors for 3 months | 2-Layered surface appearance |
| Example 12 | 648 | 654 | No change |
| Example 13 | 753 | 801 | No change |
| Example 14 | 726 | 703 | No change |
| Example 15 | 771 | 779 | No change |
| Example 16 | 836 | 869 | No change |
| Example 17 | 925 | 851 | No change |
| Comparative Example 3 | 2253 | 5795 | No change |

[Film Strength Test]

Rubber eraser tests (the film surface was continuously rubbed back and forth 50 and 100 times with a rubber eraser under a load of 1 kg and then checked for scratches) were performed on the transparent conductive layered structures in Examples 12 to 17 and the transparent conductive layered structure in Comparative Example 3 and the film strength of the transparent 2-layered film on the transparent substrate (glass substrate) was checked.

The results are shown in Table 7 below.

TABLE 7

| | Back and forth 50 [times under] 1 kg | Back and forth 100 [times under] 1 kg |
|---|---|---|
| Example 12 | ○ | ○ |
| Example 13 | ○ | ○ |
| Example 14 | ○ | Δ |
| Example 15 | ○ | Δ |
| Example 16 | ○ | ○ |
| Example 17 | ○ | ○ |
| Comparative Example 3 | Δ | X |

Evaluation criteria:
○: no scratches,
Δ: some scratches, and
X: many scratches.

[Evaluation]

1. As is clear from the results in Table 6, there are no changes in appearance of the transparent 2-layered film of each example, and there are no large changes in the initial value and the value after 3 months of standing outdoors in terms of surface resistance of the transparent 2-layered film. Consequently, it can be confirmed that weather resistance of the transparent 2-layered film of each example is satisfactory.

On the other hand, although there were no changes in appearance of the transparent 2-layered film of Comparative Example 3, there was a large change in the initial value (2,253 Ω/□) and the value after 3 months of being outdoors (5,795 Ω/□) in terms of surface resistance of the transparent 2-layered film and it can be confirmed that weather resistance of the transparent 2-layered film of Comparative Example 3 is insufficient.

2. Moreover, it can be confirmed from the results in Table 7 that mechanical strength of the transparent 2-layered film of each example is sufficient when compared to Comparative Example 3 and that mechanical strength of the transparent 2-layered film of each example is sufficient.

3. Incidentally, gold-and-silver 2-component-type microparticles (gold-containing noble metal microparticles) are used in each example and comparative example as the metal microparticles, but experiments using gold microparticles in place of these gold-containing noble metal microparticles are also being conducted. Moreover, it is being confirmed that the same evaluation as in each example is obtained when gold microparticles are used as the metal microparticles.

What is claimed is:

1. A method of producing a transparent conductive layered structure having a transparent substrate, a transparent conductive layer and a transparent coating layer, the transparent conductive layer and the transparent coating layer being formed successively in this order on the transparent substrate, comprising the steps of:

applying a coating liquid for forming a transparent conductive layer to a transparent substrate, the main components of the coating liquid being a solvent and gold microparticles or gold-coated silver microparticles in which the surface of silver particles has been coated with gold, the gold microparticles or the gold-coated silver particles having a mean particle diameter of 1 to 100 nm and dispersed in the solvent;

thereafter applying a coating liquid for forming a transparent coating layer, whose main components are a binder, a solvent and a functional group-containing compound having at least one functional group selected from mercapto groups (—SH), sulfide groups (—S—), and polysulfide groups (—$S_x$—, x≧2); and performing heat treatment.

2. A method of producing a transparent conductive layered structure according to claim 1, wherein the gold content of the gold-coated silver microparticles is set within a range of 50 to 95 wt %.

3. A method of producing a transparent conductive layered structure according to claim 1, wherein the binder is an inorganic binder whose main component is silica sol.

4. A method of producing a transparent conductive layered structure according to claim 1, wherein the coating liquid for forming a transparent conductive layer comprises an inorganic binder whose main component is silica sol.

5. A method of producing a transparent conductive layered structure having a transparent substrate, a transparent conductive layer and a transparent coating layer, the transparent conductive layer and the transparent coating layer being formed successively in this order on the transparent substrate, comprising the steps of:

applying a coating liquid for forming a transparent conductive layer to a transparent substrate, the main components of the coating liquid being a solvent, gold microparticles or gold-coated silver microparticles in which the surface of silver particles has been coated with gold, the gold microparticles or the gold-coated silver microparticles having a mean particle diameter of 1 to 100 nm and dispersed in the solvent, and a functional group-containing compound having at least one functional group selected from mercapto groups (—SH), sulfide groups (—S—), and polysulfide groups (—$S_x$—, $x \geq 2$);

thereafter applying a coating liquid for forming a transparent coating layer whose main components are a binder and a solvent; and performing heat treatment.

6. A method of producing a transparent conductive layered structure according to claim 5, wherein the gold content of the gold-coated silver microparticles is set within a range of 50 to 95 wt %.

7. A method of producing a transparent conductive layered structure according to claim 5, wherein the binder is an inorganic binder whose main component is silica sol.

8. A method of producing a transparent conductive layered structure according to claim 5, wherein the coating liquid for forming a transparent conductive layer comprises an inorganic binder whose main component is silica sol.

* * * * *